United States Patent
Hosseini et al.

(10) Patent No.: US 11,050,523 B2
(45) Date of Patent: Jun. 29, 2021

(54) TECHNIQUES TO INTERPRET CONTROL INFORMATION BASED ON A REPETITION FACTOR

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/407,963

(22) Filed: May 9, 2019

(65) Prior Publication Data

US 2019/0349138 A1 Nov. 14, 2019

Related U.S. Application Data

(60) Provisional application No. 62/671,330, filed on May 14, 2018, provisional application No. 62/670,541, filed on May 11, 2018.

(51) Int. Cl.
*H04L 1/18* (2006.01)
*H04L 1/00* (2006.01)

(52) U.S. Cl.
CPC ............ *H04L 1/189* (2013.01); *H04L 1/0003* (2013.01); *H04L 1/0009* (2013.01); *H04L 1/1819* (2013.01); *H04L 1/1822* (2013.01); *H04L 1/1858* (2013.01)

(58) Field of Classification Search
CPC ..... H04L 1/189; H04L 1/1858; H04L 1/0009; H04L 1/1822; H04L 1/0003;

(Continued)

(56) References Cited

U.S. PATENT DOCUMENTS

2018/0102890 A1* 4/2018 Yi .......................... H04L 5/0053
2018/0124709 A1* 5/2018 Seo ..................... H04W 52/367

(Continued)

FOREIGN PATENT DOCUMENTS

WO WO-2017131810 A1 8/2017

OTHER PUBLICATIONS

Huawei et al., "Compact DCI for LTE URLLC", 3GPP Draft; R1-1801873, 3GPP TSG RAN WG1 Meeting #92, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 16, 2018 (Feb. 16, 2018), 9 Pages, XP051397440, Retrieved from the Internet: URL: http://www.3gpp.org/ftp/tsg_ran/WG1_RL1/TSGR1_92/Docs/ [retrieved on Feb. 16, 2018], Section 3-4.

(Continued)

*Primary Examiner* — Thien Nguyen
(74) *Attorney, Agent, or Firm* — QUALCOMM Incorporated

(57) ABSTRACT

Techniques are described herein for adjusting control signaling for a subsequent message based on a number of retransmissions of the subsequent message. The number of repetitions of the subsequent message may be used to modify the parameters of the subsequent message and/or modify the control signaling related to the parameters of the subsequent message. Downlink control information may include a plurality of fields related to one or more parameters of the subsequent message. A size or a range of at least some of the plurality of fields may vary based on the number of repetitions of the subsequent message. The number of repetitions may be based on a repetition factor.

30 Claims, 13 Drawing Sheets

(58) Field of Classification Search
CPC ... H04L 1/1819; H04L 1/0025; H04L 1/0029; H04L 1/1845; H04L 1/1825; H04L 1/0031
See application file for complete search history.

(56) References Cited

U.S. PATENT DOCUMENTS

| | | | | |
|---|---|---|---|---|
| 2018/0279346 | A1* | 9/2018 | Jiao | H04L 1/1812 |
| 2018/0288746 | A1* | 10/2018 | Zhang | H04L 1/0031 |
| 2019/0215781 | A1* | 7/2019 | Jeon | H04W 24/10 |
| 2020/0008225 | A1* | 1/2020 | Lee | H04W 72/042 |

OTHER PUBLICATIONS

International Search Report and Written Opinion—PCT/US2019/031843—ISA/EPO—dated Aug. 27, 2019.

Samsung: "Discussion on Blind/HARQ-less POSCH Repetition for URLLC", 3GPP TSG RAN WG1 Meeting #92bis, 3GPP Draft; R1-1804341, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), 6 Pages, pp. 1-3, XP051426627, Retrieved from the Internet: URL: http://www.3gpp.org/ftp/Meetings_3GPP_SYNC/RAN1/Docs/ [retrieved on Apr. 15, 2018], Section 2.

Zte et al., "Considerations on CQI/MCS Table(s) and Related Aspects for URLLC", 3GPP Draft; R1-1801631 Considerations on CQI MCS Table(s) and Related Aspects for URLLC_Final, 3GPP TSG RAN WG1 Meeting #92, 3rd Generation Partnership Project (3GPP), Mobile Competence Centre, 650, Route Des Lucioles; F-06921 Sophia-Antipolis Cedex, France, vol. RAN WG1, No. Athens, Greece; Feb. 26, 2018-Mar. 2, 2018, Feb. 16, 2018 (Feb. 16, 2018), pp. 1-18, XP051396974, Retrieved from the Internet: URL: http://www.3gpp.org/ftp/tsg_ran/WG1_RL1/TSGR1_92/Docs/ [retrieved on Feb. 16, 2018], Section 3.3.

* cited by examiner

TECHNIQUES TO INTERPRET CONTROL INFORMATION BASED ON A REPETITION FACTOR

CROSS REFERENCES

The present Application for Patent claims the benefit of U.S. Provisional Patent Application No. 62/670,541 by HOSSEINI, et al., entitled "TECHNIQUES TO INTERPRET CONTROL INFORMATION BASED ON A REPETITION FACTOR," filed May 11, 2018, and to U.S. Provisional Patent Application No. 62/671,330 by HOSSEINI, et al., entitled "TECHNIQUES TO INTERPRET CONTROL INFORMATION BASED ON A REPETITION FACTOR" filed May 14, 2018, each of which is assigned to the assignee hereof, and each of which is expressly incorporated by reference herein.

BACKGROUND

The following relates generally to wireless communications, and more specifically to techniques to interpret control information based on a repetition factor.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support techniques to interpret control information based on a repetition factor. Generally, the described techniques provide for adjusting control signaling for a subsequent message based on a number of retransmissions of the subsequent message. The number of repetitions of the subsequent message may be used to modify the parameters of the subsequent message and/or modify the control signaling related to the parameters of the subsequent message. Downlink control information may include a plurality of fields related to one or more parameters of the subsequent message. A size or a range of at least some of the plurality of fields may vary based on the number of repetitions of the subsequent message. The number of repetitions may be based on a repetition factor.

A method of wireless communication is described. The method may include receiving, from a base station, downlink control information including a set of fields, where a first field of the set of fields includes an indication of a number of repetitions of a subsequent message, determining, based on the indicated number of repetitions, a size or range of a second field of the set of fields, interpreting the downlink control information based on the determination, and transmitting or receiving the subsequent message according to the interpreted downlink control information.

An apparatus for wireless communication is described. The apparatus may include a processor, memory in electronic communication with the processor, and instructions stored in the memory. The instructions may be executable by the processor to cause the apparatus to receive, from a base station, downlink control information including a set of fields, where a first field of the set of fields includes an indication of a number of repetitions of a subsequent message, determine, based on the indicated number of repetitions, a size or range of a second field of the set of fields, interpret the downlink control information based on the determination, and transmit or receiving the subsequent message according to the interpreted downlink control information.

Another apparatus for wireless communication is described. The apparatus may include means for receiving, from a base station, downlink control information including a set of fields, where a first field of the set of fields includes an indication of a number of repetitions of a subsequent message, determining, based on the indicated number of repetitions, a size or range of a second field of the set of fields, interpreting the downlink control information based on the determination, and transmitting or receiving the subsequent message according to the interpreted downlink control information.

A non-transitory computer-readable medium storing code for wireless communication at a user equipment (UE) is described. The code may include instructions executable by a processor to receive, from a base station, downlink control information including a set of fields, where a first field of the set of fields includes an indication of a number of repetitions of a subsequent message, determine, based on the indicated number of repetitions, a size or range of a second field of the set of fields, interpret the downlink control information based on the determination, and transmit or receiving the subsequent message according to the interpreted downlink control information.

Some examples of the method, apparatuses, and non-transitory computer-readable medium described herein may further include operations, features, means, or instructions for determining a redundancy version sequence of the subsequent message based on the indicated number of repetitions, where interpreting the downlink control information may be based on determining the redundancy version sequence.

In some examples of the method, apparatuses, and non-transitory computer-readable medium described herein, the second field may be a redundancy version field that indicates a redundancy version sequence of the subsequent message.

In some examples of the method, apparatuses, and non-transitory computer-readable medium described herein, the size or range of the redundancy version field may be inversely proportional to the indicated number of repetitions.

Some examples of the method, apparatuses, and non-transitory computer-readable medium described herein may further include operations, features, means, or instructions for determining a number of layers of the subsequent message based on the indicated number of repetitions, where interpreting the downlink control information may be based on determining the number of layers.

In some examples of the method, apparatuses, and non-transitory computer-readable medium described herein, the second field may be a layer field that indicates a number of layers of the subsequent message.

In some examples of the method, apparatuses, and non-transitory computer-readable medium described herein, the number of layers used for the subsequent message may be inversely proportional to the indicated number of repetitions.

Some examples of the method, apparatuses, and non-transitory computer-readable medium described herein may further include operations, features, means, or instructions for determining whether a demodulation reference signal (DMRS) indication may be present in the downlink control information based on the indicated number of repetitions, where interpreting the downlink control information may be based on determining whether the DMRS indication may be present.

In some examples of the method, apparatuses, and non-transitory computer-readable medium described herein, the second field may be a DMRS indication field.

In some examples of the method, apparatuses, and non-transitory computer-readable medium described herein, a size of the DMRS indication field may be proportional to the indicated number of repetitions.

Some examples of the method, apparatuses, and non-transitory computer-readable medium described herein may further include operations, features, means, or instructions for determining a modulation and coding scheme (MCS) index value of the subsequent message based on the indicated number of repetitions, where interpreting the downlink control information may be based on determining the MCS index value.

Some examples of the method, apparatuses, and non-transitory computer-readable medium described herein may further include operations, features, means, or instructions for determining a maximum modulation order of the subsequent message based on the indicated number of repetitions, where interpreting the downlink control information may be based on determining the maximum modulation order.

Some examples of the method, apparatuses, and non-transitory computer-readable medium described herein may further include operations, features, means, or instructions for determining a maximum coding rate of the subsequent message based on the indicated number of repetitions, where interpreting the downlink control information may be based on determining the maximum coding rate.

In some examples of the method, apparatuses, and non-transitory computer-readable medium described herein, one or both of a maximum modulation order or a maximum coding rate of the subsequent message may be inversely proportional to the indicated number of repetitions.

In some examples of the method, apparatuses, and non-transitory computer-readable medium described herein, the second field may be a modulation and coding scheme (MCS) index value field.

In some examples of the method, apparatuses, and non-transitory computer-readable medium described herein, the MCS index value field may be inversely proportional to the indicated number of repetitions.

Some examples of the method, apparatuses, and non-transitory computer-readable medium described herein may further include operations, features, means, or instructions for determining whether the subsequent message uses chase combining or incremental redundancy, where interpreting the downlink control information may be based on determining whether the subsequent message uses Chase coding or incremental redundancy.

Some examples of the method, apparatuses, and non-transitory computer-readable medium described herein may further include operations, features, means, or instructions for decreasing the size or range of the second field from a first value to a second value based on the indicated number of repetitions and increasing a size or range of a third field of the set of fields from a third value to a fourth value based on decreasing the size or range of the second field.

Some examples of the method, apparatuses, and non-transitory computer-readable medium described herein may further include operations, features, means, or instructions for removing a third field of the set of fields from the downlink control information based on the indicated number of repetitions.

In some examples of the method, apparatuses, and non-transitory computer-readable medium described herein, each field of the set of fields may be associated with a respective parameter of the subsequent message.

In some examples of the method, apparatuses, and non-transitory computer-readable medium described herein, the first field that includes the indication of the number of repetitions may be in a fixed position within the downlink control information.

In some examples of the method, apparatuses, and non-transitory computer-readable medium described herein, the fixed position may be a beginning of the downlink control information sequence or an ending of the downlink control information sequence.

Some examples of the method, apparatuses, and non-transitory computer-readable medium described herein may further include operations, features, means, or instructions for determining whether hybrid automatic repeat request (HARQ) feedback is to be communicated for the subsequent message based at least in part on the indicated number of repetitions, wherein interpreting the downlink control information is based at least in part on determining whether the HARQ feedback is to be communicated.

DETAILED DESCRIPTION

In some wireless communications systems, quality of service (QoS) criteria may be applied to different messages. For example, some wireless communications systems may support ultra-reliable and low latency communication (URLLC) messages. The QoS criteria of URLLC messages may emphasize reliability and latency criteria over data rate criteria. One way to increase reliability and/or latency is to retransmit messages a plurality of times.

Techniques are described herein for adjusting control signaling for a subsequent message based on a number of retransmissions of the subsequent message. The number of repetitions of the subsequent message may be used to modify the parameters of the subsequent message and/or modify the control signaling related to the parameters of the subsequent message. Downlink control information may include a plurality of fields related to one or more parameters of the subsequent message. A size or a range of at least some of the plurality of fields may vary based on the number of repetitions of the subsequent message. The number of repetitions may be based on a repetition factor. In some cases, one or more bits of a field may be reserved based on the number of repetitions of the subsequent message. For example, a device may ignore reserved bits when decoding the downlink control information. In some cases, one or more bits or one or more fields may be fixed and may be sued for pruning of the downlink control information.

Aspects of the disclosure are initially described in the context of a wireless communications system. Aspects of the disclosure are described in the context of a process flow and a structure of control information. Aspects of the disclosure are further illustrated by and described with reference to apparatus diagrams, system diagrams, and flowcharts that relate to techniques to interpret control information based on a repetition factor.

Figure 1:
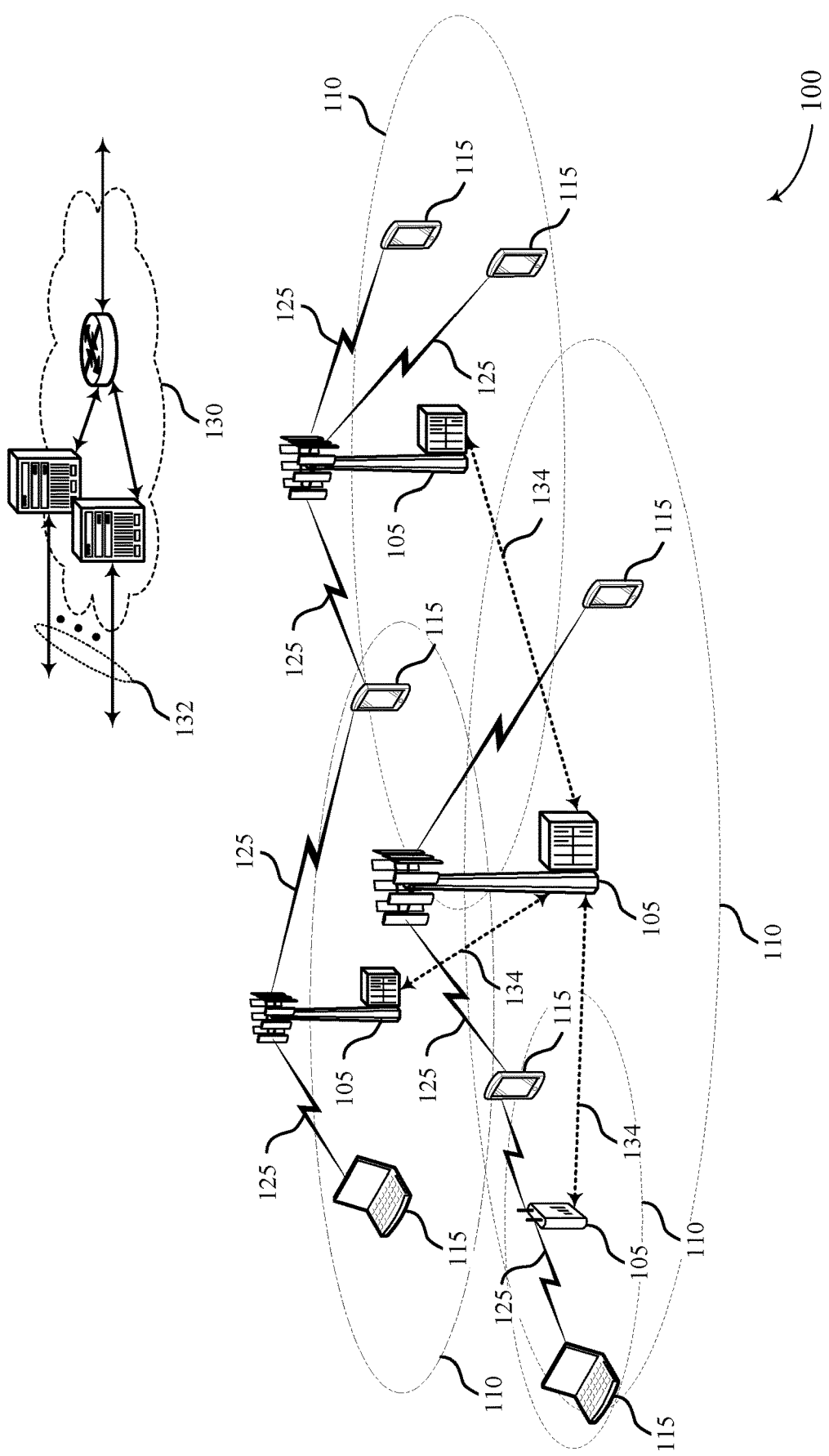
FIG. 1 illustrates an example of a system for wireless communications that supports techniques to interpret control information based on a repetition factor in accordance with aspects of the present disclosure.

FIG. 1 illustrates an example of a wireless communications system 100 that supports techniques to interpret control information based on a repetition factor in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Techniques are described herein for adjusting control signaling for a subsequent message based on a number of retransmissions of the subsequent message. The number of repetitions of the subsequent message may be used to modify the parameters of the subsequent message and/or modify the control signaling related to the parameters of the subsequent message. Downlink control information may include a plurality of fields related to one or more parameters of the subsequent message. A size or a range of at least some of the plurality of fields may vary based on the number of repetitions of the subsequent message. The number of repetitions may be based on a repetition factor.

Figure 2:
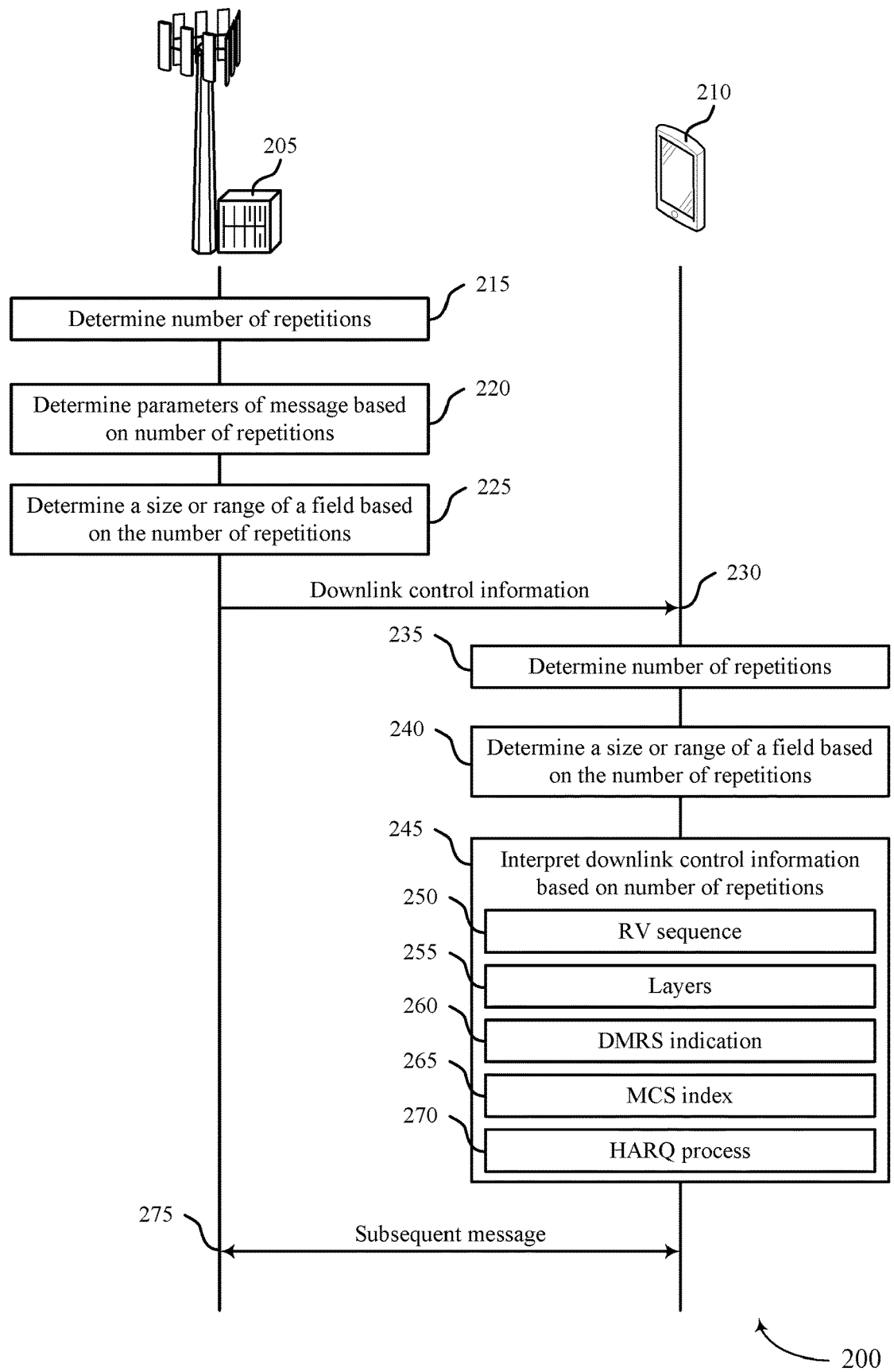
FIG. 2 illustrates an example of a process flow that supports techniques to interpret control information based on a repetition factor in accordance with aspects of the present disclosure.

FIG. 2 illustrates an example of a process flow 200 that supports techniques to interpret control information based on a repetition factor in accordance with aspects of the present disclosure. In some examples, the process flow 200 may implement aspects of wireless communications system 100. The process flow 200 may illustrate communications between and operations performed by a base station 205 and a UE 210. The base station 205 may be an example of a base station 105 described with reference to FIG. 1. The UE 210 may be an example of a UE 115 described with reference to FIG. 1.

The process flow 200 may illustrate techniques to interpret downlink control information based on a number of repetitions of a message. Repetition-based transmissions may be used to meet a QoS requirement of a URLLC message. The primary objectives for URLLC messages may be to meet reliability targets and latency targets. Achieving high data rates may not be a primary objective of URLLC messages. To meet the QoS requirements, one or more parameters of a URLLC message may be set such that the data rate may be reduced. Further, control signaling for URLLC messages may be modified to de-emphasize parameters related to high data rates and/or emphasize parameters related to meeting reliability targets and latency targets. In some cases, the number of repetitions of a message may be used to alter the parameters of a message and/or alter the control signaling related to the parameters of a message.

For example, parameters of a message may be based on the number of repetitions and/or a processing timeline for a message. Examples of parameters that may be affected by the number of repetitions and/or a processing timeline of a message may include a number of layers used to communicate the message, the modulation and coding scheme (MCS) range of the message, a MCS index value of the message, a maximum MCS index value, a maximum modulation order of the message, a maximum coding rate of the message, a HARQ process of the message (e.g., chase combining or incremental redundancy), a redundancy version (RV) sequences of the message, whether the message includes a demodulation reference signal (DMRS) indication, or a combination thereof.

The sizes or range of fields in downlink control information may be modified based on the number of repetitions of the message. For example, the size or range of some fields may be reduced, while the size or range of other fields may be increased. The UE 210 may interpret the downlink control information based on the number of repetitions of the message indicated by the downlink control information.

In some cases, the number of bits of a field or an information element in the downlink control information may be changed based on the number of repetitions of the message. For example, the size of the field used to indicate the MCS index may vary between five bits long and two bits long based on the number of repetitions of the message. In some cases, the range of the information in the field or information element in the downlink control information may be changed based on the number of repetitions of the message. For example, the amount of useful information in a field may be determined by the range and any remaining bits in the field that are outside the range may be zero-padded. For instance, the left-most bits of the MCS field may be filled with zeros or somehow reserved to ensure that large MCS index values are not included in the downlink control information. Such examples may be applied to fields other than the MCS field.

In some cases, one or more bits of a field may be reserved based on the number of repetitions of the subsequent message. For example, a device may ignore reserved bits when decoding the downlink control information. In some cases, one or more bits or one or more fields may be fixed and may be sued for pruning of the downlink control information.

At block 215, the base station 205 may determine a number of repetitions for a subsequent message 275 indicated by downlink control information 230. In some cases, the number of repetitions may be based on QoS requirements associated with the subsequent message 275. For example, if the subsequent message 275 is a URLLC message, the number of repetitions may be greater than if the subsequent message 275 is a normal message. In some cases, the number of repetitions may be represented by a repetition factor (K), where values of the repetition factor may be between one and six. As part of determining the number of repetitions for the subsequent message 275, the base station 205 may determine the QoS requirements of the subsequent message 275 or other factors that may affect the number of repetitions.

At block 220, the base station 205 may determine one or more parameters or a range of parameters associated with a particular number of repetitions of the subsequent message 275. The base station 205 may identify a mapping of the number of repetitions (e.g., a repetition factor) to a variety of parameters. Examples of the parameters determined by the base station 205 may include the number of repetitions and/or a processing timeline of a message may include a number of layers used to communicate the message, the MCS range of the message, a maximum MCS index value, a maximum modulation order of the message, a maximum coding rate of the message, a HARQ process used by the communication (e.g., chase combining or incremental redundancy or whether HARQ feedback is used at all), RV sequences used for the message, whether the message includes a DMRS indication, a physical downlink control channel (PDCCH) rate-matching indication, or a combination thereof.

At block 225, the base station 205 may determine a size or range of a field of downlink control information 230 based on the number of repetitions of the subsequent message 275. For example, the base station 205 may decrease the size or range of a first field from a baseline value associated with zero repetitions and may increase a size or range of a second field from a baseline value associated with zero repetitions. In such a manner, the base station 205 may adjust the contents of the downlink control information 230 to better meet the needs and/or the QoS criteria of the subsequent message 275. Additional details about the fields is described herein in more detail. In some cases, the total size of the downlink control information 230 may be fixed.

The base station 205 may transmit the downlink control information 230 to the UE 210. The downlink control information 230 may include an allocation of resources for the subsequent message 275 and/or values of other parameters for the subsequent message 275. The downlink control information 230 may include a plurality of fields dedicated to different parameters or information of the subsequent message 275. In some cases, the size of the fields of the downlink control information 230 may be adjustable. In some cases, the range of the information in the fields of the downlink control information 230 may be adjustable. In such cases, the remaining bits in a field may be padded with information-less bits such as zero-padding or ones-padding. In some cases, a field may be removed from the downlink control information 230 or added to the downlink control information 230, as compared to a baseline value, based on the number of repetitions.

The downlink control information 230 may include a repetition field that may serve as an indicator of the number of repetitions of the subsequent message 275. The repetition field may be two bits to indicate up to eight different repetition factors. In some cases, the repetition field indicates a number of repetitions. In some cases, the repetition field indicates an index value associated with the number of repetitions.

In some cases, the repetition field may be positioned in a fixed location in the downlink control information 230. Because the UE 210 may interpret the fields of the downlink control information 230 based on the number of repetitions indicated, the repetition field may be placed in same location of the downlink control information 230 to allow the UE 210 to blindly decode the repetition factor. Once the repetition factor is known, the UE 210 may adjust its interpretation of the remaining portions of the downlink control information 230. In some cases, the repetition field is at the beginning of the downlink control information 230. In some cases, the repetition field is at the end of the downlink control information 230. In some cases, the repetition field may be positioned at any location in the downlink control information 230 as long as that location is known to the receiving entity (e.g., UE 210).

At block 235, the UE 210 may determine a number of repetitions of the subsequent message 275 based on receiving the downlink control information 230. The UE 210 may locate and decode the repetition field (e.g., repetition factor) in the downlink control information 230 to determine the number of repetitions of the subsequent message 275.

At block 240, the UE 210 may determine a size or range of a plurality of fields in the downlink control information 230 based on determining the number of repetitions for the subsequent message 275. The UE 210 may determine whether a particular field may be present in the downlink control information 230 based on the number of repetitions. The UE 210 may determine whether the size of a field or the range of a field is different than a baseline value in the downlink control information 230.

At block 245, the UE 210 may interpret the downlink control information 230 based on determining the size or range of the plurality of fields. The UE 210 may determine parameter ranges, field size values, field range values, or other information based on a mapping to the number of repetitions of the subsequent message 275 indicated in the downlink control information 230. In some cases, the UE 210 may identify these values based on preconfigured mappings. Specific examples of parameter values and field values that may be determined based on the number of repetitions is described herein.

In some cases, when interpreting the downlink control information 230, the UE 210 may identify which bits in the downlink control information 230 correspond with specific fields. The UE 210 may then perform one or more actions based on the information encoded in the bits of the specific fields. The UE 210 may identify a starting bit of each field and/or may use the size or range of each field when interpreting the downlink control information 230. In some cases, the downlink control information 230 may include a field that includes the PDCCH rate-matching indication.

At block 250, the UE 210 may determine a RV sequence for the subsequent message 275 based on the number of repetitions of the subsequent message 275. In some cases, as the number of repetitions increases, the RV sequence for the subsequent message 275 may become simpler. As the number of repetitions increases, the RV sequence may be reduced because high data rates may not be the primary consideration for the subsequent message. For example, the RV sequence for high numbers of repetitions may include a single RV or may be an alternating pattern of two RVs. For lower numbers of repetitions, the RV sequence may include more than two redundancy versions and the RV sequence may be more complex.

The UE 210 may determine a size or range of a redundancy version field in the downlink control information 230 based on the number of repetitions. The number of bits used in the downlink control information 230 to indicate the RV sequence may be altered based on the number of repetitions. For example, the size or range of the redundancy version field may be inversely proportional to the number of repetitions such that as the number of repetitions goes up, the size or range of the redundancy version field may go down. In some cases, the size or range of the redundancy version field may be two bits, one bit, or zero bits. In some cases, the downlink control information 230 may not include a redundancy version field based on the number of repetitions. In some cases, one or more bits of the redundancy version field may be reserved based on the number of repetitions.

At block 255, the UE 210 may determine a number of layers used to communicate the subsequent message 275 based on the number of repetitions of the subsequent message 275. In some cases, as the number of repetitions increases, the number of layers used to communicate the subsequent message 275 for the subsequent message 275 may decrease. For example, as the number of repetitions increases, the number of layers may be reduced because high data rates may not be the primary consideration for the subsequent message 275.

The UE 210 may determine a size or range of a layer field in the downlink control information 230 based on the number of repetitions. The number of bits used in the downlink control information 230 to indicate the layers used to communicate the subsequent message 275 may be altered based on the number of repetitions. For example, the size or range of the layer field may be inversely proportional to the number of repetitions such that as the number of repetitions goes up, the size or range of the layer field may go down. In some cases, the downlink control information 230 may not include a layer field based on the number of repetitions. In some cases, one or more bits of the layer field may be reserved based on the number of repetitions. For example, if the repetition factor is large (e.g., a large number of repetitions), the number of layers may be set at one and the bits in the layer field may be reserved.

At block 260, the UE 210 may determine whether the subsequent message 275 and/or the downlink control information 230 includes a DMRS indicator based on the number of repetitions of the subsequent message 275. In some cases, to provide higher data rates, the DMRS indicator may be omitted from some messages. If reliability and latency are the primary considerations for a message, there may be little benefit and greater cost to not include the DMRS indicator. In some examples, as the number of repetitions crosses a threshold, the DMRS indicator is included in the downlink control information 230.

The UE 210 may determine a size or range of a DMRS indication field in the downlink control information 230 based on the number of repetitions. The number of bits used in the downlink control information 230 to indicate the DMRS indication may be altered based on the number of repetitions. For example, the size or range of the DMRS indication field may be proportional to the number of repetitions such that as the number of repetitions goes up, the size or range of the DMRS indication field may go up. In some cases, the size or range of the DMRS indication field may be one bit or zero bits. In some cases, the downlink control information 230 may not include a DMRS indication field based on the number of repetitions. In some cases, one or more bits of the DMRS indication field may be reserved based on the number of repetitions.

At block 265, the UE 210 may determine an MCS index value for the subsequent message 275 based on the number of repetitions of the subsequent message 275. In some cases, as the number of repetitions increases, the MCS index value for the subsequent message 275 may become lower because high data rates may not be the primary consideration for the subsequent message. For example, the MCS index value for high numbers of repetitions may be capped to a maximum value.

The UE 210 may determine a size or range of an MCS field in the downlink control information 230 based on the number of repetitions. The number of bits used in the downlink control information 230 to indicate the MCS index value may be altered based on the number of repetitions. For example, the size or range of the MCS field may be inversely proportional to the number of repetitions such that as the number of repetitions goes up, the size or range of the MCS field may go down. In some cases, the size or range of the MCS field may be five bits, four bits, three bits, or two bits. In some cases, the downlink control information 230 may not include an MCS field based on the number of repetitions. In some cases, one or more bits of the MCS field may be reserved based on the number of repetitions.

Additionally or alternatively, the UE 210 may determine a maximum modulation order of the subsequent message based on the number of repetitions. Higher-order modulation schemes may be used to achieve higher data rates. For some messages, however, higher data rates may not be the primary goal. Further, higher-order modulation schemes (e.g., 256 quadrature amplitude modulation (QAM) or 1024 QAM) may increase error rates and/or may require additional power to perform. In some cases, the maximum modulation order may be set based on the number of repetitions of the subsequent message 275. For example, if the number of repetitions is at a maximum number of repetitions, the maximum modulation order may be capped at quadrature phase shift keying (QPSK). In some cases, where the repetition factor is large, only a single modulation scheme may be used and the bits of a field used to indicate the modulation order may be reserved.

In some cases, the downlink control information 230 may include a field that has a variable size or range to indicate maximum modulation order. In some cases, the maximum modulation order information may be incorporated into the MCS index value or into the MCS field.

Additionally or alternatively, the UE 210 may determine a maximum coding rate of the subsequent message based on the number of repetitions. In some cases, the downlink control information 230 may include a field that has a variable size or range to indicate maximum coding rate. In some cases, the maximum coding rate information may be incorporated into the MCS index value or into the MCS field.

At block 270, the UE 210 may determine a HARQ process for the subsequent message 275 based on the number of repetitions of the subsequent message 275. For example, the UE 210 may determine whether the subsequent message 275 uses chase combining or incremental redundancy. In some cases, the UE 210 may determine whether HARQ-ACK feedback is to be provided at all. For example, as number of repetitions (e.g., repetition factor) increases, the UE 210 may determine that it will not transmit HARQ-ACK for downlink communications. The mapping of the number of repetitions (e.g., repetition factor) to the HARQ-ACK feedback may be predefined in one or more static or semi-static configurations or may be dynamically configured as part of establishing/maintaining a communication link.

The UE 210 may determine a size or range of a HARQ process field in the downlink control information 230 based on the number of repetitions. The number of bits used in the downlink control information 230 to indicate the HARQ process may be altered based on the number of repetitions. For example, the size or range of the HARQ process field may be inversely proportional to the number of repetitions such that as the number of repetitions goes up, the size or range of the HARQ process field may go down. In some cases, the size or range of the HARQ process four bits or three bits. In some cases, the downlink control information 230 may not include a HARQ process field based on the number of repetitions. For example, in cases where HARQ-ACK feedback is not to be communicated, the downlink control information 230 may not include a HARQ process field. In some cases, one or more bits of the HARQ process field may be reserved based on the number of repetitions. In some cases, if HARQ-ACK is not to be communicated, the downlink control information 230 may be configured to not include a new data indicator (NDI).

The subsequent message 275 may be transmitted or received based on interpreting the downlink control information 230. The subsequent message 275 may be an uplink transmission or a downlink transmission. If the subsequent message 275 is an uplink transmission, the UE 210 may transmit the subsequent message 275 using the parameters indicated in the downlink control information 230. If the subsequent message 275 is a downlink transmission, the base station 205 may transmit the subsequent message using the parameters indicated in the downlink control information 230.

Figure 3:
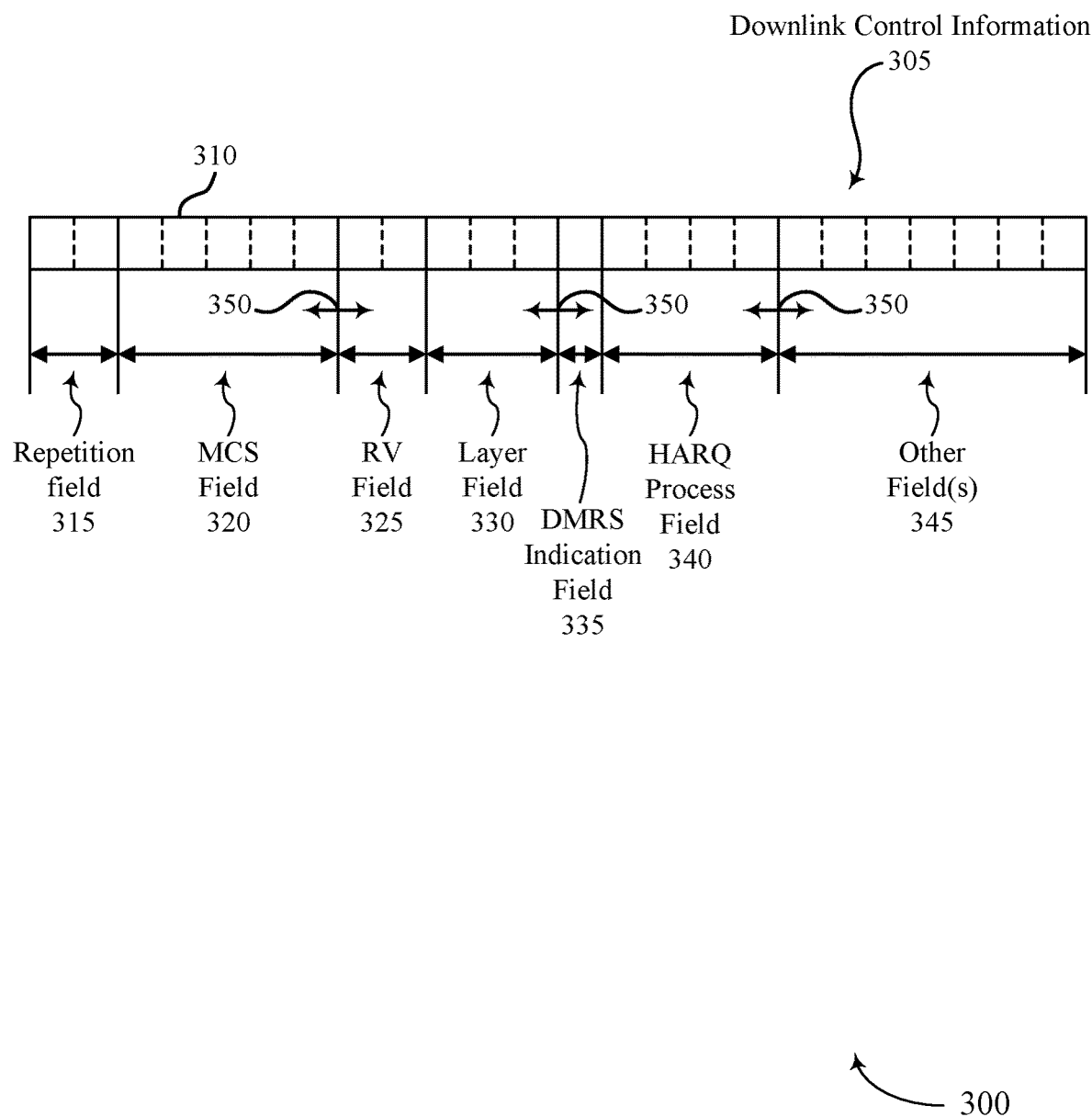
FIG. 3 illustrates an example of a structure of control information that supports techniques to interpret control information based on a repetition factor in accordance with aspects of the present disclosure.

FIG. 3 illustrates an example of a structure 300 for control information that supports techniques to interpret control information based on a repetition factor in accordance with aspects of the present disclosure. In some examples, the structure 300 may implement aspects of wireless communications system 100. The structure 300 may be for downlink control information 305, which may be an example of downlink control information 230 as described with reference to FIG. 2.

The downlink control information 305 may include a plurality of fields, where the size or range of some of the fields may be adjustable based on the number of repetitions of a subsequent message. The downlink control information 305 may comprise a plurality of bits 310, each bit representing a logic '0' or a logic '1'. The downlink control information 305 may include a plurality of fields that each comprise one or more bits 310. The downlink control information 305 may include a repetition field 315, an MCS field 320, a RV field 325, a layer field 330, a DMRS indication field 335, a HARQ process field 340, one or more other fields 345, or any combination thereof.

The repetition field 315 may indicate a repetition factor or a number of repetitions for a subsequent message. In some cases, the repetition field 315 is two bits in size. The repetition field 315 may be an example of the repetition field described with reference to FIG. 2. In some cases, the repetition field 315 is positioned in a fixed location of the downlink control information 305 to facilitate interpretation of the downlink control information 305 by a UE.

The MCS field 320 may indicate an MCS index value, a maximum modulation order value, a maximum coding rate value, or a combination thereof. In some cases, the MCS field 320 is five bits, four bits, three bits, or two bits in size. The MCS field 320 may be an example of the MCS field described with reference to FIG. 2.

The RV field 325 may indicate a RV sequence of the subsequent message. In some cases, the RV field 325 is three bits, two bits, one bit, or zero bits in size. The RV field 325 may be an example of the redundancy version field described with reference to FIG. 2.

The layer field 330 may indicate a number of layers (or antenna ports) that may be used to transmit or receive a subsequent message. The layer field 330 may be an example of the layer field described with reference to FIG. 2.

The DMRS indication field 335 may indicate whether the subsequent message includes a DMRS indication. In some cases, the DMRS indication field 335 is one bit or zero bits in size. The DMRS indication field 335 may be an example of the DMRS indication field described with reference to FIG. 2. In some cases, the DMRS indication field 335 may be an example of a field used to indicate a DMRS position indicator.

The HARQ process field 340 may indicate a HARQ process (e.g., chase combining or incremental redundancy) to be used on the subsequent message. In some cases, the HARQ process field 340 may be four bits or three bits in size. The HARQ process field 340 may be an example of the HARQ process field described with reference to FIG. 2. In cases where HARQ-ACK feedback is not to be communicated, the downlink control information 230 may not include a HARQ process field.

The one or more other fields 345 may be examples of any number of other fields that may be included in the downlink control information 305. The size or range of these other fields 345 may vary (e.g., increase or decrease from a baseline) based on the number of repetitions of the subsequent message. Examples of these other fields 345 may include a field that includes a flag to differentiate between uplink and/or downlink, a field to indicate a type of resource allocation (e.g., resource allocation type 1 or resource allocation type 2), a field to indicate new data, a field for a transmit power control (TPC) command, a field to indicate a downlink assignment index, a field to indicate an sounding reference signal (SRS) request, a field that includes a used/unused a short physical downlink control channel (sPDCCH) resource indication, a field that include a short physical uplink control channel (sPUCCH) resource indication, or a combination thereof.

Arrows 350 illustrate how the size of the fields 315, 320, 325, 330, 335, 340, and/or 345 may vary based on the number of repetitions of the subsequent message. Some fields may include more bits and some fields may include less bits (as compared to a baseline) based on the number of repetitions of the subsequent message. The starting bit-positions of some fields may vary based on the varying sizes of the fields in the downlink control information 305.

Figure 4:
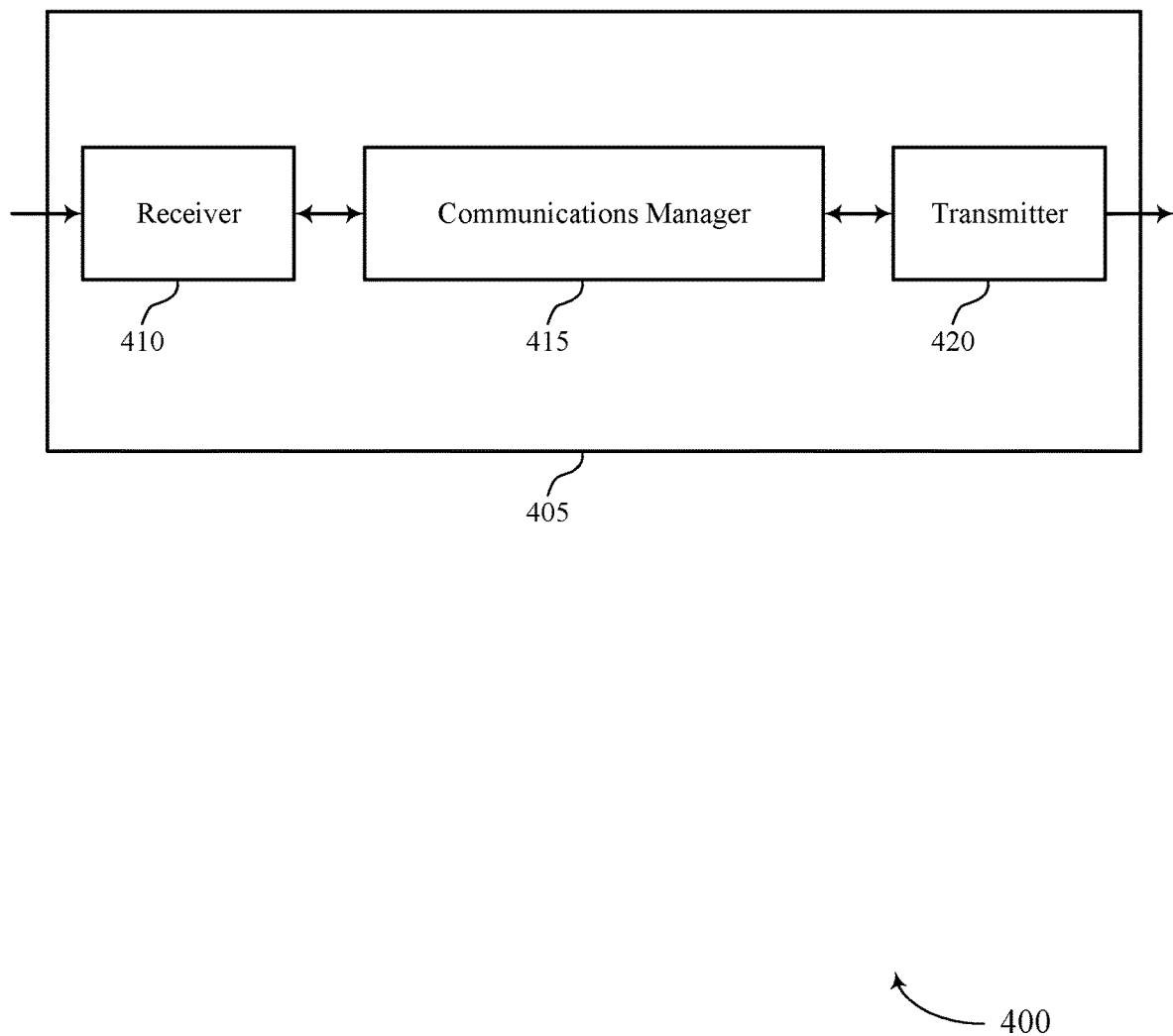
FIGS. 4 and 5 show block diagrams of devices that support techniques to interpret control information based on a repetition factor in accordance with aspects of the present disclosure.

FIG. 4 shows a block diagram 400 of a device 405 that supports techniques to interpret control information based on a repetition factor in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques to interpret control information based on a repetition factor, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive, from a base station, downlink control information including a set of fields, where a first field of the set of fields includes an indication of a number of repetitions of a subsequent message, interpret the downlink control information based on the determination, determine, based on the indicated number of repetitions, a size or range of a second field of the set of fields, and transmit or receive the subsequent message according to the interpreted downlink control information. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
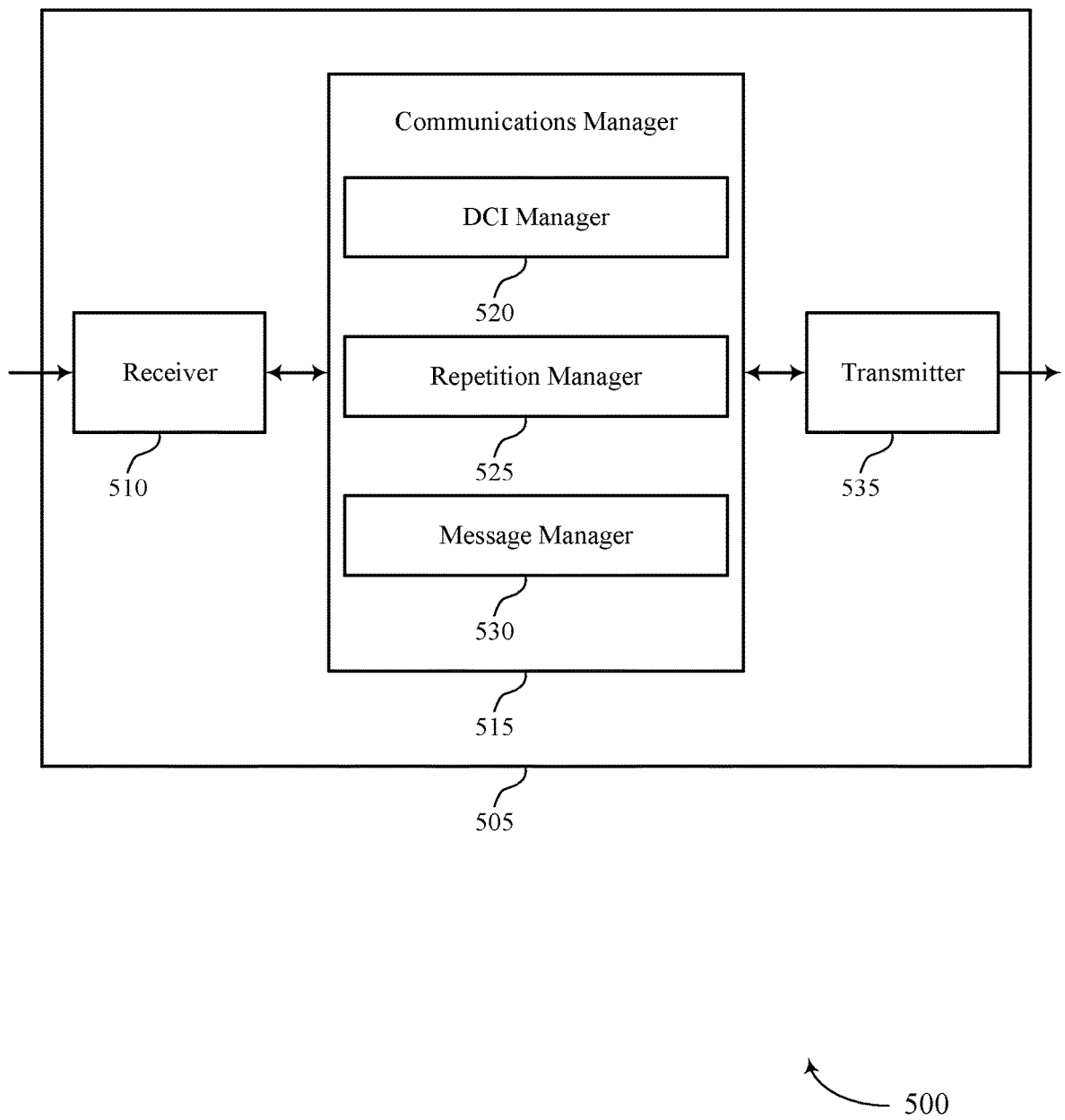

FIG. 5 shows a block diagram 500 of a device 505 that supports techniques to interpret control information based on a repetition factor in accordance with aspects of the present disclosure. The device 505 may be an example of aspects of a device 405 or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to techniques to interpret control information based on a repetition factor, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a downlink control information (DCI) manager 520, a repetition manager 525, and a message manager 530. The communications manager 515 may be an example of aspects of the communications manager 710 described herein.

The DCI manager 520 may receive, from a base station, downlink control information including a set of fields, where a first field of the set of fields includes an indication of a number of repetitions of a subsequent message and interpret the downlink control information based on the determination.

The repetition manager 525 may determine, based on the indicated number of repetitions, a size or range of a second field of the set of fields.

The message manager 530 may transmit or receive the subsequent message according to the interpreted downlink control information.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
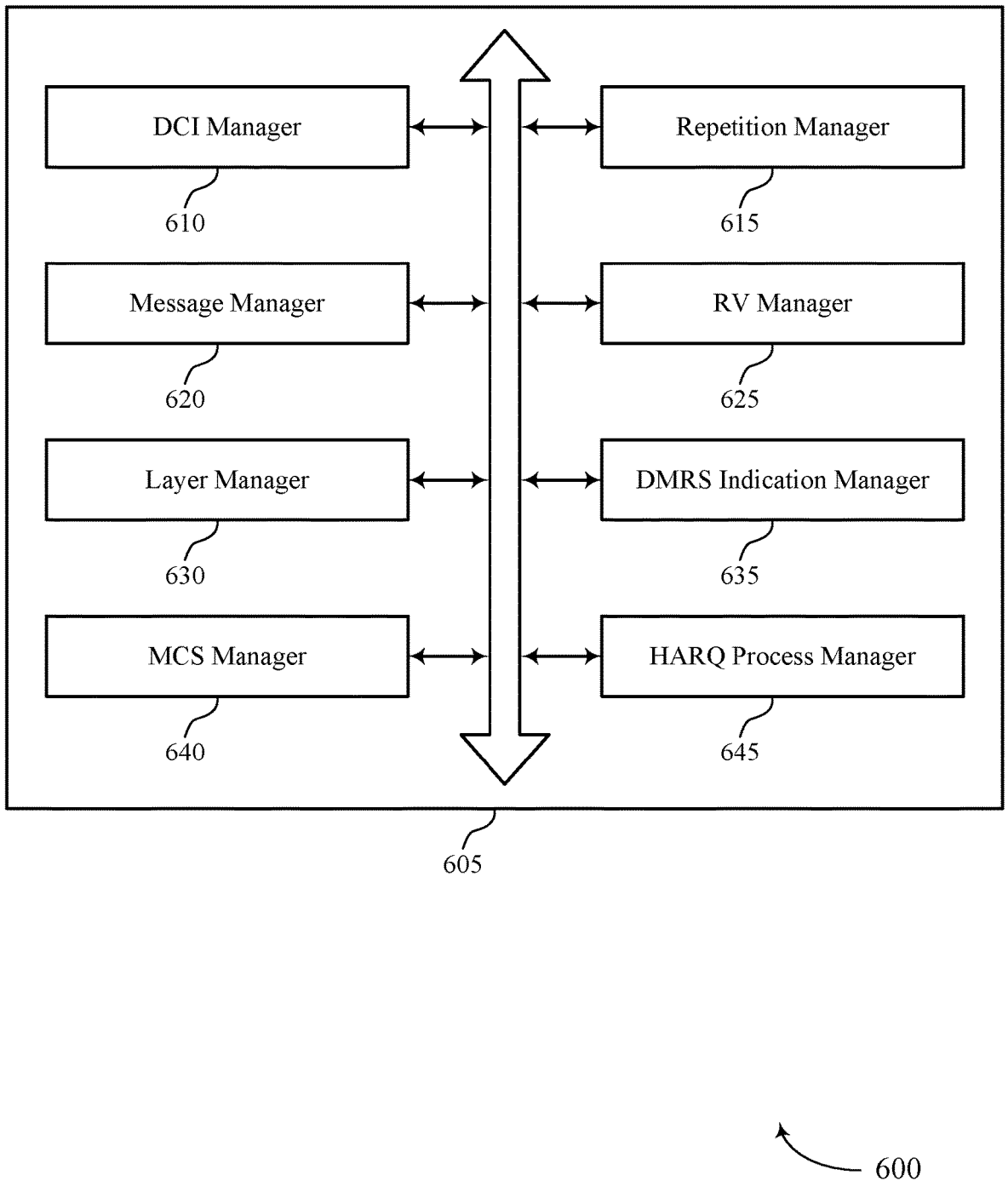
FIG. 6 shows a block diagram of a communications manager that supports techniques to interpret control information based on a repetition factor in accordance with aspects of the present disclosure.

FIG. 6 shows a block diagram 600 of a communications manager 605 that supports techniques to interpret control information based on a repetition factor in accordance with aspects of the present disclosure. The communications manager 605 may be an example of aspects of a communications manager 415, a communications manager 515, or a communications manager 710 described herein. The communications manager 605 may include a DCI manager 610, a repetition manager 615, a message manager 620, a RV manager 625, a layer manager 630, a DMRS indication manager 635, a MCS manager 640, and a HARQ process manager 645. Each of these modules may communicate, directly or indirectly, with one another (e.g., via one or more buses).

The DCI manager 610 may receive, from a base station, downlink control information including a set of fields, where a first field of the set of fields includes an indication of a number of repetitions of a subsequent message. In some examples, the DCI manager 610 may interpret the downlink control information based on the determination. The repetition manager 615 may determine, based on the indicated number of repetitions, a size or range of a second field of the set of fields. In some cases, the first field that includes the indication of the number of repetitions is in a fixed position within the downlink control information. In some cases, the fixed position is a beginning of the downlink control information sequence or an ending of the downlink control information sequence.

The message manager 620 may transmit or receive the subsequent message according to the interpreted downlink control information. In some examples, the message manager 620 may decrease the size or range of the second field from a first value to a second value based on the indicated number of repetitions. In some examples, the message manager 620 may increase a size or range of a third field of the set of fields from a third value to a fourth value based on decreasing the size or range of the second field. In some examples, the message manager 620 may remove a third field of the set of fields from the downlink control information based on the indicated number of repetitions. In some cases, each field of the set of fields is associated with a respective parameter of the subsequent message.

The RV manager 625 may determine a redundancy version sequence of the subsequent message based on the indicated number of repetitions, where interpreting the downlink control information is based on determining the redundancy version sequence. In some cases, the second field is a redundancy version field that indicates a redundancy version sequence of the subsequent message. In some cases, the size or range of the redundancy version field is inversely proportional to the indicated number of repetitions.

The layer manager 630 may determine a number of layers of the subsequent message based on the indicated number of repetitions, where interpreting the downlink control information is based on determining the number of layers. In some cases, the second field is a layer field that indicates a number of layers of the subsequent message. In some cases, the number of layers used for the subsequent message is inversely proportional to the indicated number of repetitions.

The DMRS indication manager 635 may determine whether a DMRS indication is present in the downlink control information based on the indicated number of repetitions, where interpreting the downlink control information is based on determining whether the DMRS indication is present. In some cases, the second field is a DMRS indication field. In some cases, a size of the DMRS indication field is proportional to the indicated number of repetitions.

The MCS manager 640 may determine an MCS index value of the subsequent message based on the indicated number of repetitions, where interpreting the downlink control information is based on determining the MCS index value. In some examples, the MCS manager 640 may determine a maximum modulation order of the subsequent message based on the indicated number of repetitions, where interpreting the downlink control information is based on determining the maximum modulation order.

In some examples, the MCS manager 640 may determine a maximum coding rate of the subsequent message based on the indicated number of repetitions, where interpreting the downlink control information is based on determining the maximum coding rate. In some cases, one or both of a maximum modulation order or a maximum coding rate of the subsequent message is inversely proportional to the indicated number of repetitions. In some cases, the second field is an MCS index value field. In some cases, the MCS index value field is inversely proportional to the indicated number of repetitions.

The HARQ process manager 645 may determine whether the subsequent message uses chase combining or incremental redundancy, where interpreting the downlink control information is based on determining whether the subsequent message uses chase combining or incremental redundancy. The HARQ process manager 645 may determine whether HARQ feedback is to be communicated for the subsequent message based at least in part on the indicated number of repetitions, wherein interpreting the downlink control information is based at least in part on determining whether the HARQ feedback is to be communicated.

Figure 7:
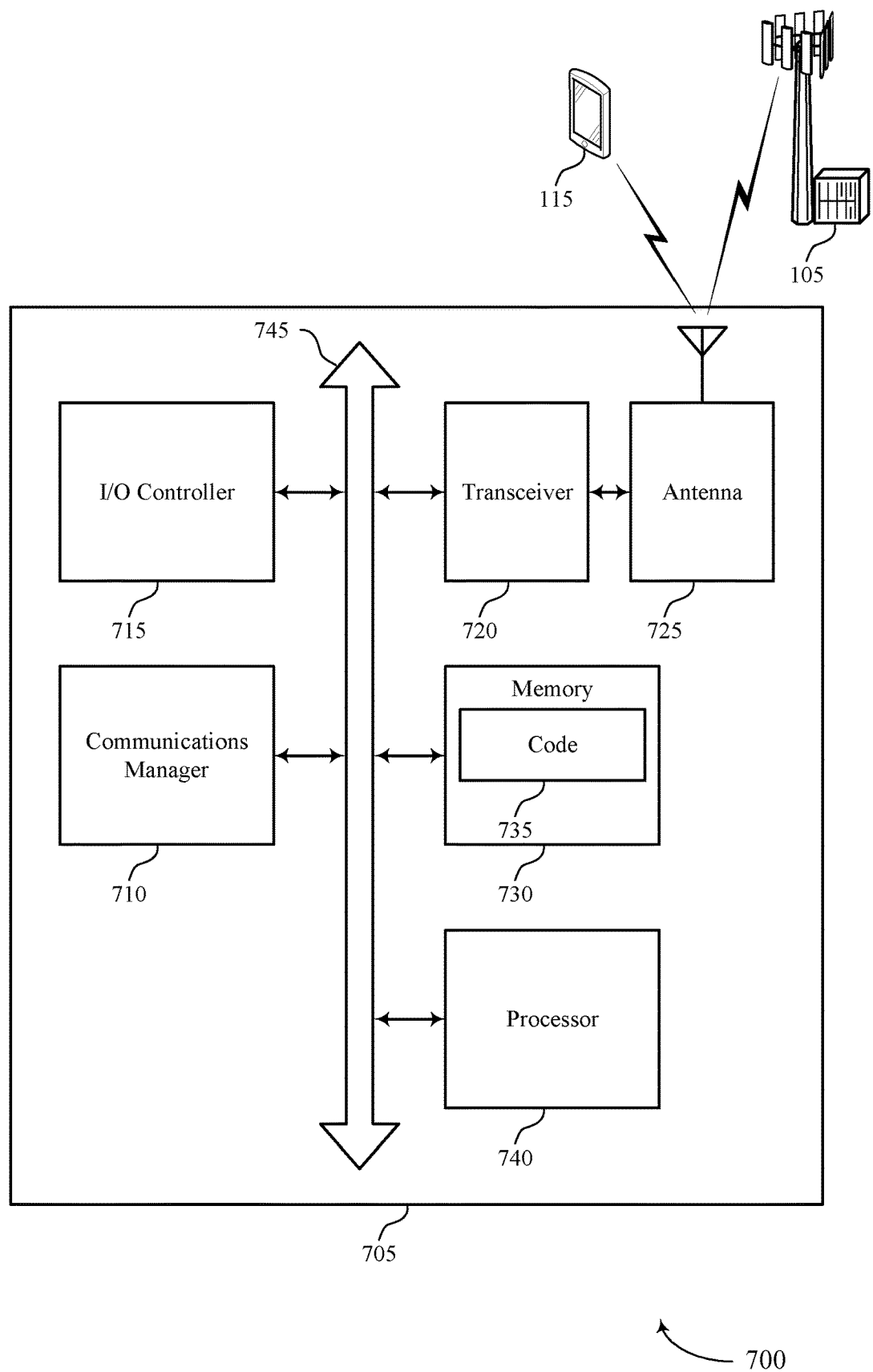
FIG. 7 shows a diagram of a system including a device that supports techniques to interpret control information based on a repetition factor in accordance with aspects of the present disclosure.

FIG. 7 shows a diagram of a system 700 including a device 705 that supports techniques to interpret control information based on a repetition factor in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive, from a base station, downlink control information including a set of fields, where a first field of the set of fields includes an indication of a number of repetitions of a subsequent message, interpret the downlink control information based on the determination, determine, based on the indicated number of repetitions, a size or range of a second field of the set of fields, and transmit or receive the subsequent message according to the interpreted downlink control information.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touch-screen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a basic input/output (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques to interpret control information based on a repetition factor).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
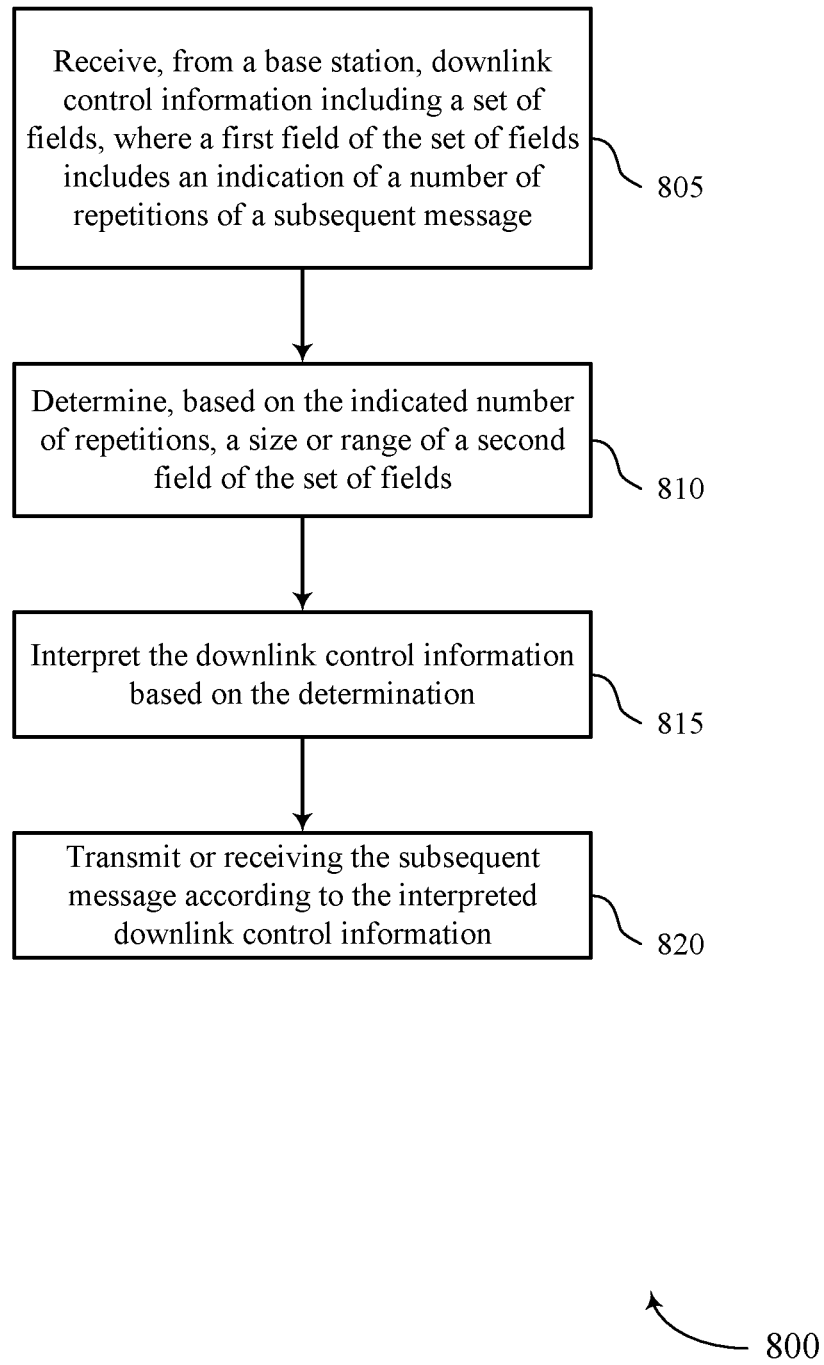
FIGS. 8 through 13 show flowcharts illustrating methods that support techniques to interpret control information based on a repetition factor in accordance with aspects of the present disclosure.

FIG. 8 shows a flowchart illustrating a method 800 that supports techniques to interpret control information based on a repetition factor in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may receive, from a base station, downlink control information including a set of fields, where a first field of the set of fields includes an indication of a number of repetitions of a subsequent message. The operations of 805 may be performed according to the methods described herein. In some examples, aspects of the operations of 805 may be performed by a DCI manager as described with reference to FIGS. 4 through 7.

At 810, the UE may determine, based on the indicated number of repetitions, a size or range of a second field of the set of fields. The operations of 810 may be performed according to the methods described herein. In some examples, aspects of the operations of 810 may be performed by a repetition manager as described with reference to FIGS. 4 through 7.

At 815, the UE may interpret the downlink control information based on the determination. The operations of 815 may be performed according to the methods described herein. In some examples, aspects of the operations of 815 may be performed by a DCI manager as described with reference to FIGS. 4 through 7.

At 820, the UE may transmit or receive the subsequent message according to the interpreted downlink control information. The operations of 820 may be performed according to the methods described herein. In some examples, aspects of the operations of 820 may be performed by a message manager as described with reference to FIGS. 4 through 7.

Figure 9:
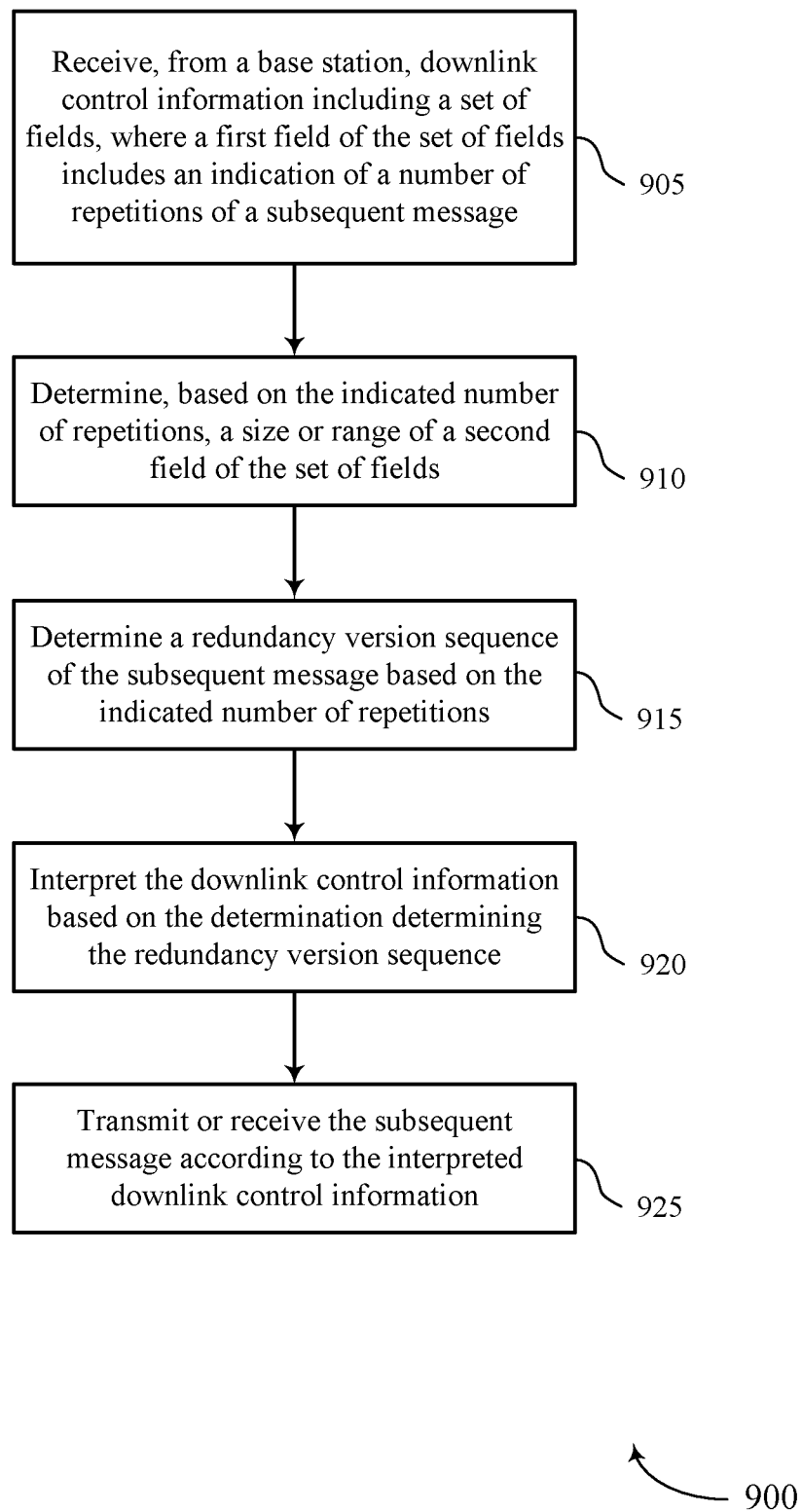

FIG. 9 shows a flowchart illustrating a method 900 that supports techniques to interpret control information based on a repetition factor in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may receive, from a base station, downlink control information including a set of fields, where a first field of the set of fields includes an indication of a number of repetitions of a subsequent message. The operations of 905 may be performed according to the methods described herein. In some examples, aspects of the operations of 905 may be performed by a DCI manager as described with reference to FIGS. 4 through 7.

At 910, the UE may determine, based on the indicated number of repetitions, a size or range of a second field of the set of fields. The operations of 910 may be performed according to the methods described herein. In some examples, aspects of the operations of 910 may be performed by a repetition manager as described with reference to FIGS. 4 through 7.

At 915, the UE may determine a redundancy version sequence of the subsequent message based on the indicated number of repetitions. The operations of 915 may be performed according to the methods described herein. In some examples, aspects of the operations of 915 may be performed by a RV manager as described with reference to FIGS. 4 through 7.

At 920, the UE may interpret the downlink control information based on the determination and determining the redundancy version sequence. The operations of 920 may be performed according to the methods described herein. In some examples, aspects of the operations of 920 may be performed by a DCI manager as described with reference to FIGS. 4 through 7.

At 925, the UE may transmit or receive the subsequent message according to the interpreted downlink control information. The operations of 925 may be performed according to the methods described herein. In some examples, aspects of the operations of 925 may be performed by a message manager as described with reference to FIGS. 4 through 7.

Figure 10:
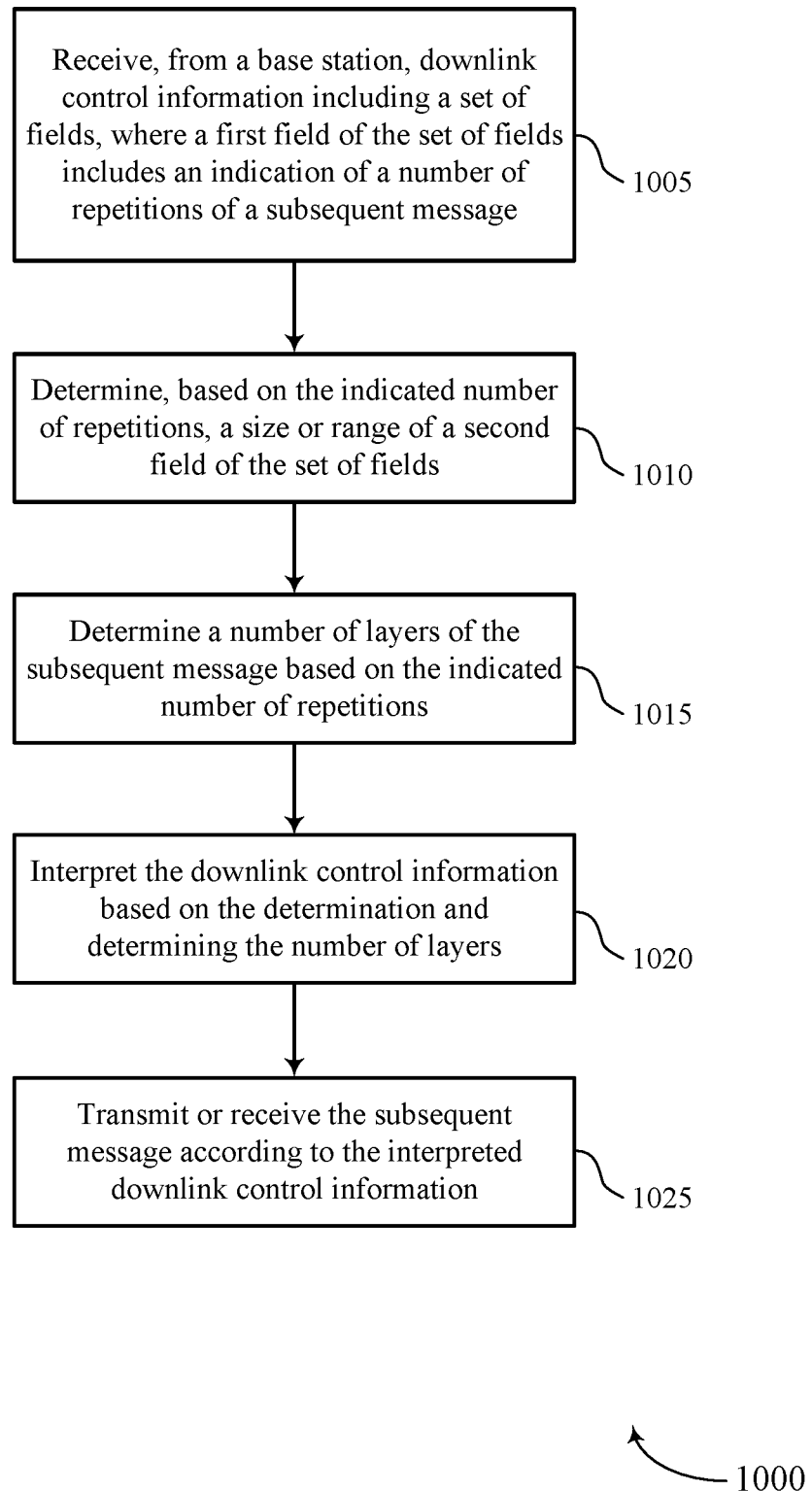

FIG. 10 shows a flowchart illustrating a method 1000 that supports techniques to interpret control information based on a repetition factor in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1005, the UE may receive, from a base station, downlink control information including a set of fields, where a first field of the set of fields includes an indication of a number of repetitions of a subsequent message. The operations of 1005 may be performed according to the methods described herein. In some examples, aspects of the operations of 1005 may be performed by a DCI manager as described with reference to FIGS. 4 through 7.

At 1010, the UE may determine, based on the indicated number of repetitions, a size or range of a second field of the set of fields. The operations of 1010 may be performed according to the methods described herein. In some examples, aspects of the operations of 1010 may be performed by a repetition manager as described with reference to FIGS. 4 through 7.

At 1015, the UE may determine a number of layers of the subsequent message based on the indicated number of repetitions. The operations of 1015 may be performed according to the methods described herein. In some examples, aspects of the operations of 1015 may be performed by a layer manager as described with reference to FIGS. 4 through 7.

At 1020, the UE may interpret the downlink control information based on the determination and determining the number of layers. The operations of 1020 may be performed according to the methods described herein. In some examples, aspects of the operations of 1020 may be performed by a DCI manager as described with reference to FIGS. 4 through 7.

At 1025, the UE may transmit or receive the subsequent message according to the interpreted downlink control information. The operations of 1025 may be performed according to the methods described herein. In some examples, aspects of the operations of 1025 may be performed by a message manager as described with reference to FIGS. 4 through 7.

Figure 11:
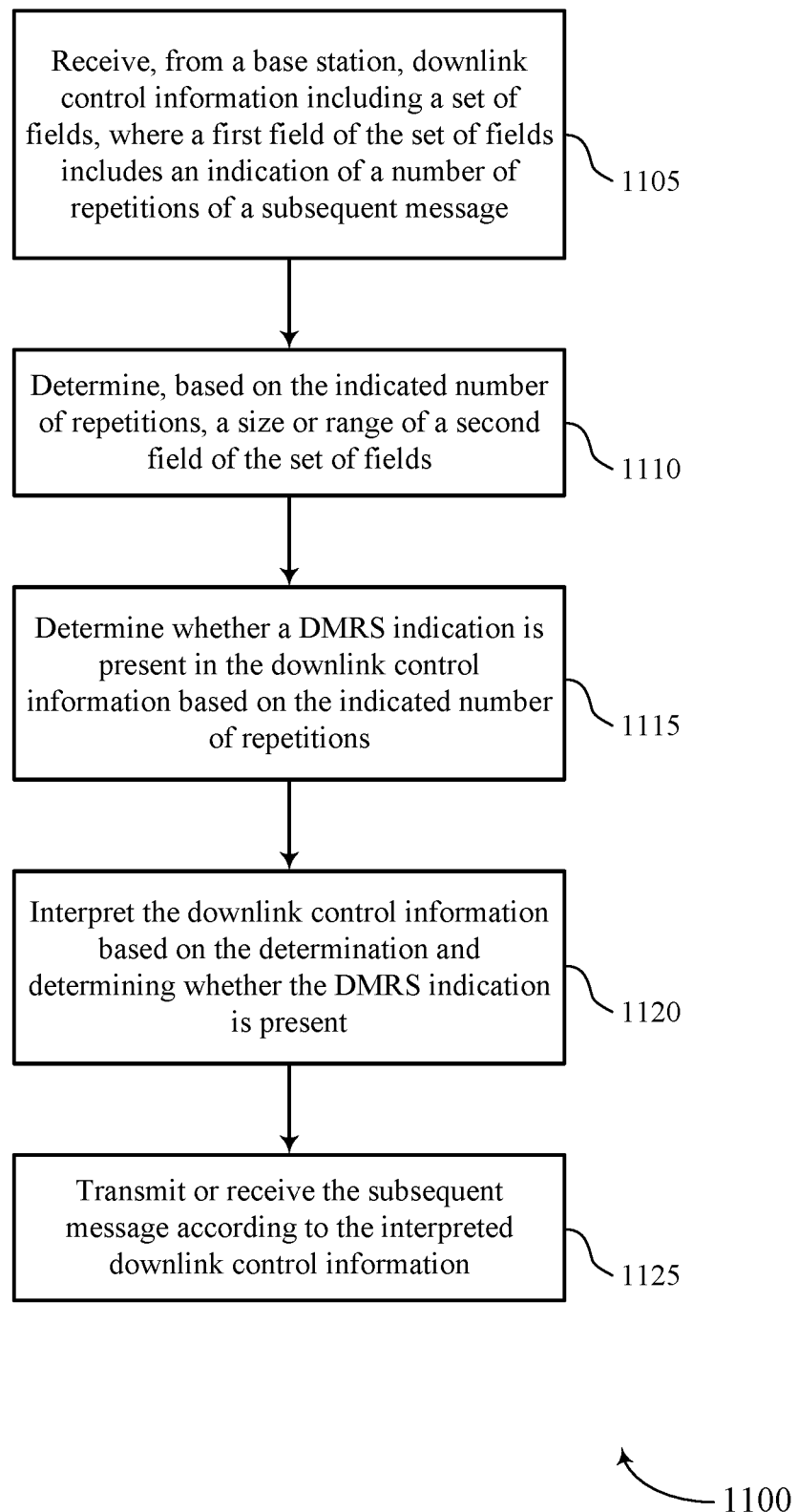

FIG. 11 shows a flowchart illustrating a method 1100 that supports techniques to interpret control information based on a repetition factor in accordance with aspects of the present disclosure. The operations of method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1105, the UE may receive, from a base station, downlink control information including a set of fields, where a first field of the set of fields includes an indication of a number of repetitions of a subsequent message. The operations of 1105 may be performed according to the methods described herein. In some examples, aspects of the operations of 1105 may be performed by a DCI manager as described with reference to FIGS. 4 through 7.

At 1110, the UE may determine, based on the indicated number of repetitions, a size or range of a second field of the set of fields. The operations of 1110 may be performed according to the methods described herein. In some examples, aspects of the operations of 1110 may be performed by a repetition manager as described with reference to FIGS. 4 through 7.

At 1115, the UE may determine whether a DMRS indication is present in the downlink control information based on the indicated number of repetitions. The operations of 1115 may be performed according to the methods described herein. In some examples, aspects of the operations of 1115 may be performed by a DMRS indication manager as described with reference to FIGS. 4 through 7.

At 1120, the UE may interpret the downlink control information based on the determination and determining whether the DMRS indication is present. The operations of 1120 may be performed according to the methods described herein. In some examples, aspects of the operations of 1120 may be performed by a DCI manager as described with reference to FIGS. 4 through 7.

At 1125, the UE may transmit or receive the subsequent message according to the interpreted downlink control information. The operations of 1125 may be performed according to the methods described herein. In some examples, aspects of the operations of 1125 may be performed by a message manager as described with reference to FIGS. 4 through 7.

Figure 12:
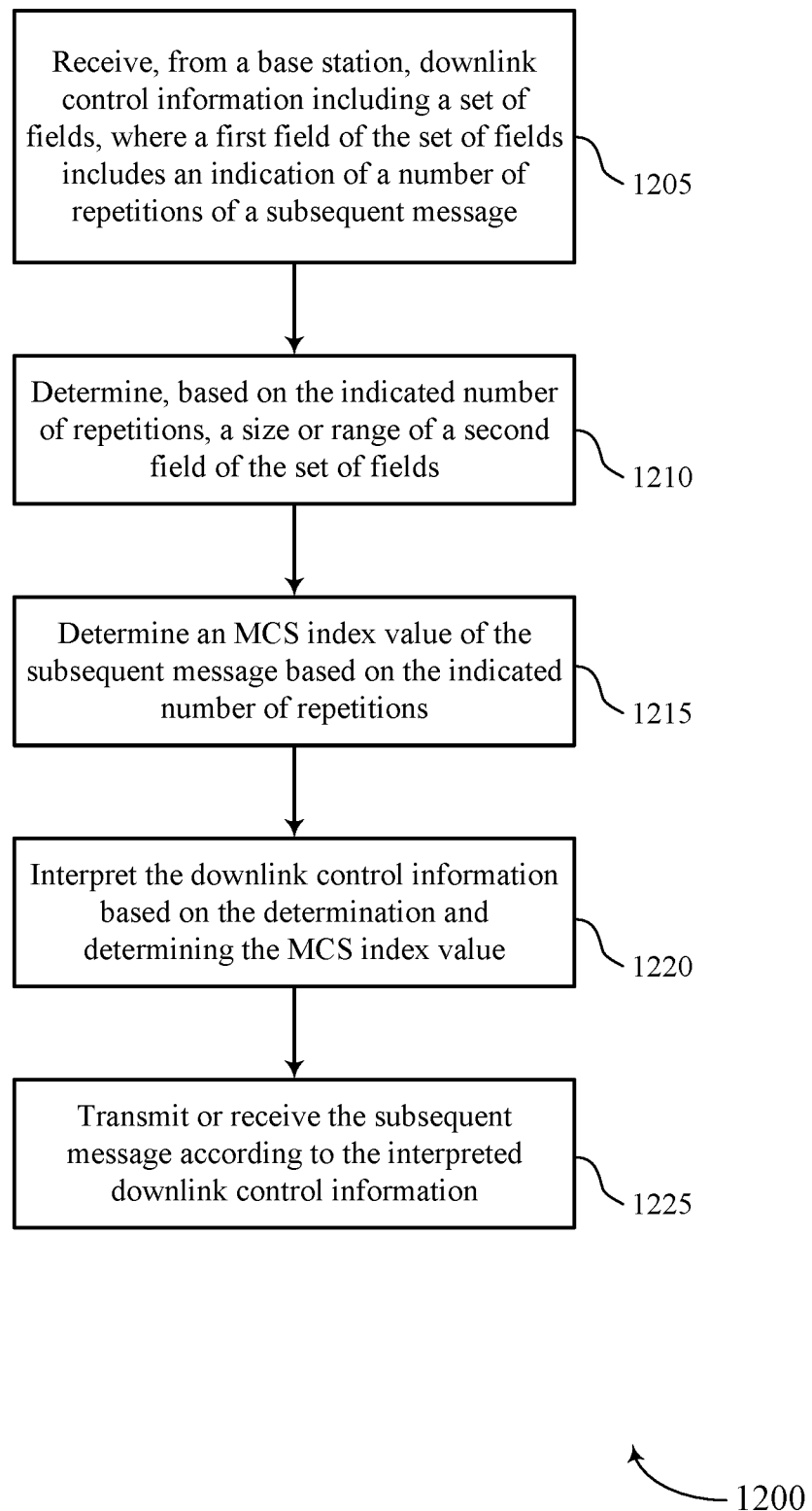

FIG. 12 shows a flowchart illustrating a method 1200 that supports techniques to interpret control information based on a repetition factor in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive, from a base station, downlink control information including a set of fields, where a first field of the set of fields includes an indication of a number of repetitions of a subsequent message. The operations of 1205 may be performed according to the methods described herein. In some examples, aspects of the operations of 1205 may be performed by a DCI manager as described with reference to FIGS. 4 through 7.

At 1210, the UE may determine, based on the indicated number of repetitions, a size or range of a second field of the set of fields. The operations of 1210 may be performed according to the methods described herein. In some examples, aspects of the operations of 1210 may be performed by a repetition manager as described with reference to FIGS. 4 through 7.

At 1215, the UE may determine an MCS index value of the subsequent message based on the indicated number of repetitions. The operations of 1215 may be performed according to the methods described herein. In some examples, aspects of the operations of 1215 may be performed by an MCS manager as described with reference to FIGS. 4 through 7.

At 1220, the UE may interpret the downlink control information based on the determination and determining the MCS index value. The operations of 1220 may be performed according to the methods described herein. In some examples, aspects of the operations of 1220 may be performed by a DCI manager as described with reference to FIGS. 4 through 7.

At 1225, the UE may transmit or receive the subsequent message according to the interpreted downlink control information. The operations of 1225 may be performed according to the methods described herein. In some examples, aspects of the operations of 1225 may be performed by a message manager as described with reference to FIGS. 4 through 7.

Figure 13:
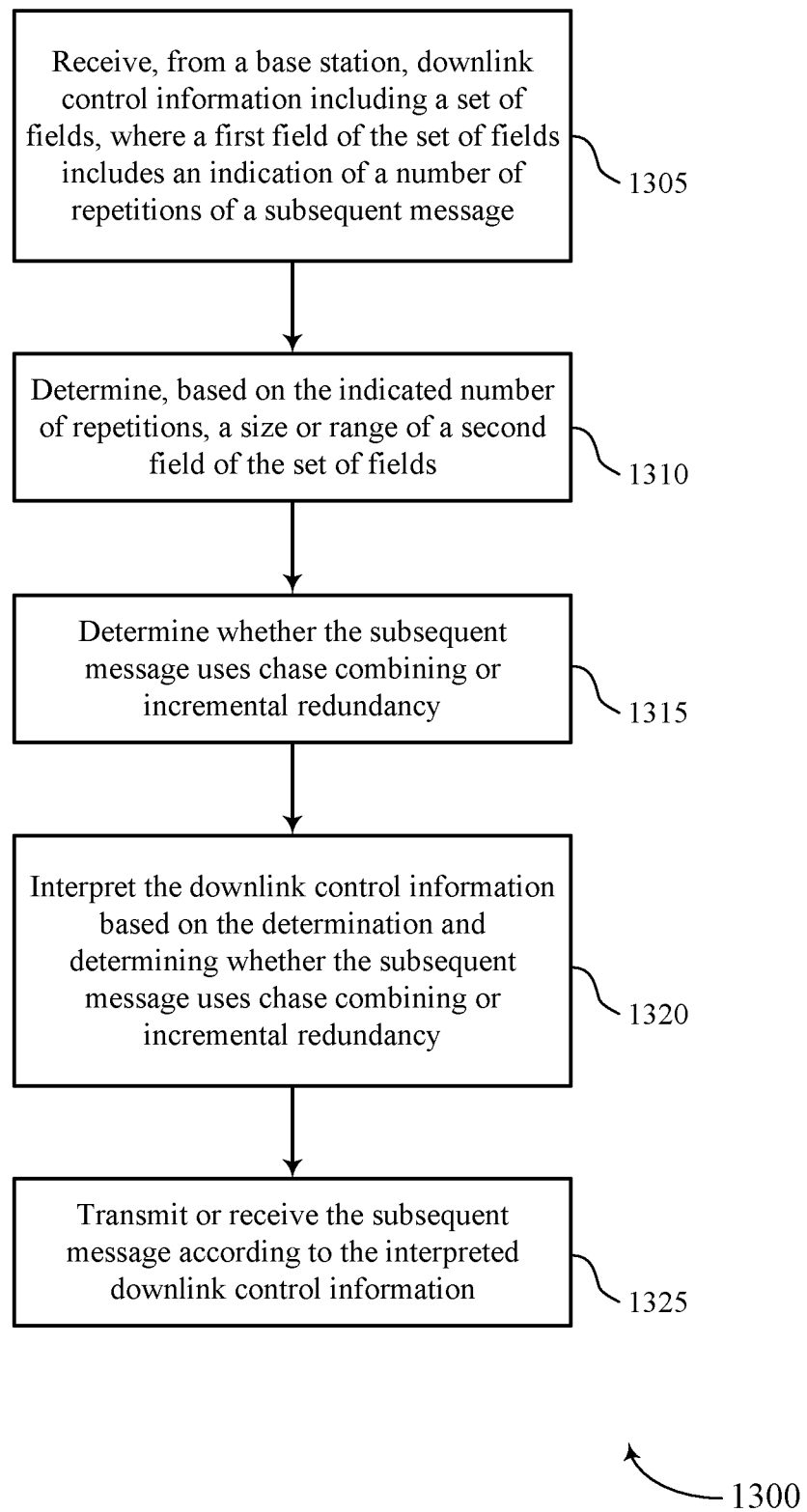

FIG. 13 shows a flowchart illustrating a method 1300 that supports techniques to interpret control information based on a repetition factor in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, downlink control information including a set of fields, where a first field of the set of fields includes an indication of a number of repetitions of a subsequent message. The operations of 1305 may be performed according to the methods described herein. In some examples, aspects of the operations of 1305 may be performed by a DCI manager as described with reference to FIGS. 4 through 7.

At 1310, the UE may determine, based on the indicated number of repetitions, a size or range of a second field of the set of fields. The operations of 1310 may be performed according to the methods described herein. In some examples, aspects of the operations of 1310 may be performed by a repetition manager as described with reference to FIGS. 4 through 7.

At 1315, the UE may determine whether the subsequent message uses chase combining or incremental redundancy. The operations of 1315 may be performed according to the methods described herein. In some examples, aspects of the operations of 1315 may be performed by a HARQ process manager as described with reference to FIGS. 4 through 7.

At 1320, the UE may interpret the downlink control information based on the determination and determining whether the subsequent message uses chase combining or incremental redundancy. The operations of 1320 may be performed according to the methods described herein. In some examples, aspects of the operations of 1320 may be performed by a DCI manager as described with reference to FIGS. 4 through 7.

At 1325, the UE may transmit or receive the subsequent message according to the interpreted downlink control information. The operations of 1325 may be performed according to the methods described herein. In some examples, aspects of the operations of 1325 may be performed by a message manager as described with reference to FIGS. 4 through 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication at a user equipment (UE), comprising:
    receiving, from a base station, downlink control information comprising a plurality of fields and a mapping of a repetition factor to each of the plurality of fields;
    decoding a first field of the plurality of fields comprising the repetition factor that corresponds to a cardinal number of repetitions of a subsequent message;
    determining, based at least in part on the cardinal number of repetitions and the received mapping, a size or range of a second field of the plurality of fields;
    interpreting remaining fields of the downlink control information based at least in part on the determination; and
    transmitting or receiving, by the UE, the subsequent message according to the interpreted remaining fields of the downlink control information.

2. The method of claim 1, further comprising:
    determining a redundancy version sequence of the subsequent message based at least in part on the mapping received in the downlink control information, the mapping comprising a mapping of the redundancy version sequence to the cardinal number of repetitions, wherein interpreting the downlink control information is based at least in part on determining the redundancy version sequence.

3. The method of claim 1, wherein the second field is a redundancy version field that indicates a redundancy version sequence of the subsequent message.

4. The method of claim 1, further comprising:
    determining a number of layers of the subsequent message based at least in part on the mapping received in the downlink control information, the mapping comprising a mapping of the number of layers to the cardinal number of repetitions, wherein interpreting the downlink control information is based at least in part on determining the number of layers.

5. The method of claim 1, wherein the second field is a layer field that indicates a number of layers of the subsequent message.

6. The method of claim 1, further comprising:
    determining whether a demodulation reference signal (DMRS) indication is present in the downlink control information based at least in part on the mapping received in the downlink control information, the mapping comprising a mapping of the DMRS indication to the cardinal number of repetitions, wherein interpreting the downlink control information is based at least in part on determining whether the DMRS indication is present.

7. The method of claim 1, wherein the second field is a demodulation reference signal (DMRS) indication field.

8. The method of claim 1, further comprising:
    determining a modulation and coding scheme (MCS) index value of the subsequent message based at least in part on the mapping received in the downlink control information, the mapping comprising a mapping of the MCS index value to the cardinal number of repetitions, wherein interpreting the downlink control information is based at least in part on determining the MCS index value.

9. The method of claim 1, further comprising:
determining a maximum modulation order of the subsequent message based at least in part on the mapping received in the downlink control information, the mapping comprising a mapping of the maximum modulation order of the subsequent message to the cardinal number of repetitions, wherein interpreting the downlink control information is based at least in part on determining the maximum modulation order.

10. The method of claim 1, further comprising:
determining a maximum coding rate of the subsequent message based at least in part on the mapping received in the downlink control information, the mapping comprising a mapping of the maximum coding rate of the subsequent message to the cardinal number of repetitions, wherein interpreting the downlink control information is based at least in part on determining the maximum coding rate.

11. The method of claim 1, wherein one or both of a maximum modulation order or a maximum coding rate of the subsequent message is inversely proportional to the cardinal number of repetitions.

12. The method of claim 1, wherein the second field is a modulation and coding scheme (MCS) index value field.

13. The method of claim 1, further comprising:
determining whether the subsequent message uses chase combining or incremental redundancy, wherein interpreting the downlink control information is based at least in part on determining whether the subsequent message uses chase combining or incremental redundancy.

14. The method of claim 1, further comprising:
decreasing the size or range of the second field from a first value to a second value based at least in part on the mapping received in the downlink control information and the cardinal number of repetitions; and
increasing a size or range of a third field of the plurality of fields from a third value to a fourth value based at least in part on decreasing the size or range of the second field.

15. The method of claim 1, further comprising:
removing a third field of the plurality of fields from the downlink control information based at least in part on the mapping received in the downlink control information and the cardinal number of repetitions.

16. The method of claim 1, wherein each field of the plurality of fields is associated with a respective parameter of the subsequent message.

17. The method of claim 1, wherein the first field that includes the repetition factor corresponding to the cardinal number of repetitions is in a fixed position within the downlink control information.

18. The method of claim 1, further comprising:
determining whether hybrid automatic repeat request (HARQ) feedback is to be communicated for the subsequent message based at least in part on the cardinal number of repetitions, wherein interpreting the downlink control information is based at least in part on determining whether the HARQ feedback is to be communicated.

19. An apparatus for wireless communication at a user equipment (UE), comprising:

a processor,
memory in electronic communication with the processor; and
instructions stored in the memory, wherein the instructions are executable by the processor to:
receive, from a base station, downlink control information comprising a plurality of fields and a mapping of a repetition factor to each of the plurality of fields;
decode a first field of the plurality of fields comprising the repetition factor that corresponds to a cardinal number of repetitions of a subsequent message;
determine, based at least in part on the cardinal number of repetitions and the received mapping, a size or range of a second field of the plurality of fields;
interpret remaining fields of the downlink control information based at least in part on the determination; and
transmit or receive, by the UE, the subsequent message according to the interpreted remaining fields of the downlink control information.

20. The apparatus of claim 19, wherein the instructions are further executable by the processor to:
determine a redundancy version sequence of the subsequent message based at least in part on the mapping received in the downlink control information, the mapping comprising a mapping of the redundancy version sequence to the cardinal number of repetitions, wherein interpreting the downlink control information is based at least in part on determining the redundancy version sequence.

21. The apparatus of claim 19, wherein the second field is a redundancy version field that indicates a redundancy version sequence of the subsequent message.

22. The apparatus of claim 19, wherein the instructions are further executable by the processor to:
determine a number of layers of the subsequent message based at least in part on the mapping received in the downlink control information, the mapping comprising a mapping of the number of layers to the cardinal number of repetitions, wherein interpreting the downlink control information is based at least in part on determining the number of layers.

23. The apparatus of claim 19, wherein the second field is a layer field that indicates a number of layers of the subsequent message.

24. The apparatus of claim 19, wherein the instructions are further executable by the processor to:
determine whether a demodulation reference signal (DMRS) indication is present in the downlink control information based at least in part on the mapping received in the downlink control information, the mapping comprising a mapping of the DMRS indication to the cardinal number of repetitions, wherein interpreting the downlink control information is based at least in part on determining whether the DMRS indication is present.

25. The apparatus of claim 19, wherein the second field is a demodulation reference signal (DMRS) indication field.

26. The apparatus of claim 19, wherein the instructions are further executable by the processor to:
determine a modulation and coding scheme (MCS) index value of the subsequent message based at least in part on the mapping received in the downlink control information, the mapping comprising a mapping of the MCS index value to the cardinal number of repetitions, wherein interpreting the downlink control information is based at least in part on determining the MCS index value.

27. The apparatus of claim 19, wherein the instructions are further executable by the processor to:

determine a maximum modulation order of the subsequent message based at least in part on the mapping received in the downlink control information, the mapping comprising a mapping of the maximum modulation order of the subsequent message to the cardinal number of repetitions, wherein interpreting the downlink control information is based at least in part on determining the maximum modulation order.

28. The apparatus of claim 19, wherein the instructions are further executable by the processor to:

determine a maximum coding rate of the subsequent message based at least in part on the mapping received in the downlink control information, the mapping comprising a mapping of the maximum coding rate of the subsequent message to the cardinal number of repetitions, wherein interpreting the downlink control information is based at least in part on determining the maximum coding rate.

29. An apparatus of wireless communication at a user equipment (UE), comprising:

means for receiving, from a base station, downlink control information comprising a plurality of fields and a mapping of a repetition factor to each of the plurality of fields;

means for decoding a first field of the plurality of fields comprising the repetition factor that corresponds to a cardinal number of repetitions of a subsequent message;

means for determining, based at least in part on the cardinal number of repetitions and the received mapping, a size or range of a second field of the plurality of fields;

means for interpreting remaining fields of the downlink control information based at least in part on the determination; and means for transmitting or receiving, by the UE, the subsequent message according to the interpreted remaining fields of the downlink control information.

30. A non-transitory computer-readable medium storing code for wireless communication at a user equipment (UE), the code comprising instructions executable to:

receive, from a base station, downlink control information comprising a plurality of fields and a mapping of a repetition factor to each of the plurality of fields;

decode a first field of the plurality of fields comprising the repetition factor that corresponds to a cardinal number of repetitions of a subsequent message;

determine, based at least in part on the cardinal number of repetitions and the received mapping, a size or range of a second field of the plurality of fields;

interpret remaining fields of the downlink control information based at least in part on the determination; and transmit or receive, by the UE, the subsequent message according to the interpreted remaining fields of the downlink control information.

* * * * *